United States Patent [19]

Sullivan et al.

[11] 4,193,968
[45] Mar. 18, 1980

[54] PROCESS FOR RECOVERING GALLIUM

[75] Inventors: Robert E. Sullivan, Louisville, Ky.; William R. Stern; Bess L. Vance, both of Tucson, Ariz.

[73] Assignee: The Anaconda Company, Denver, Colo.

[21] Appl. No.: 948,296

[22] Filed: Oct. 3, 1978

[51] Int. Cl.$^2$ ............ C01G 15/00; C01F 7/00; C01G 49/00
[52] U.S. Cl. .................. 423/112; 423/139; 423/DIG. 14; 75/101 BE; 423/132
[58] Field of Search ............ 423/112, 139, 658.5, 423/DIG. 14; 75/101 BE

[56] References Cited

U.S. PATENT DOCUMENTS

| | | | |
|---|---|---|---|
| 3,082,062 | 3/1963 | Preuss | 423/112 |
| 3,144,304 | 8/1964 | Nagumo et al. | 423/112 |
| 3,151,946 | 10/1964 | Nagumo et al. | 423/112 |
| 3,725,527 | 4/1973 | Yamamura et al. | 423/112 |

FOREIGN PATENT DOCUMENTS

| | | | |
|---|---|---|---|
| 39-11354 | 6/1964 | Japan | 423/112 |
| 45-25580 | 8/1970 | Japan | 423/112 |
| 45-25581 | 8/1970 | Japan | 423/112 |

Primary Examiner—Herbert T. Carter
Attorney, Agent, or Firm—Pennie & Edmonds

[57] ABSTRACT

The invention provides a process for recovering gallium from calcined clay leached with hydrochloric acid. The leach solution containing aluminum, ferric and gallium chlorides is treated by ion exchange to first remove aluminum ions, following which the solution containing ferric and gallium chlorides is treated to reduce the ferric ions to ferrous ions. The reduced solution is acidified with hydrochloric acid sufficiently to insure that the gallium is present in the form $GaCl_4^-$ ions, and is then again treated by ion exchange to separate the ferrous ions from the gallium for ultimate recovery of the latter.

4 Claims, 1 Drawing Figure

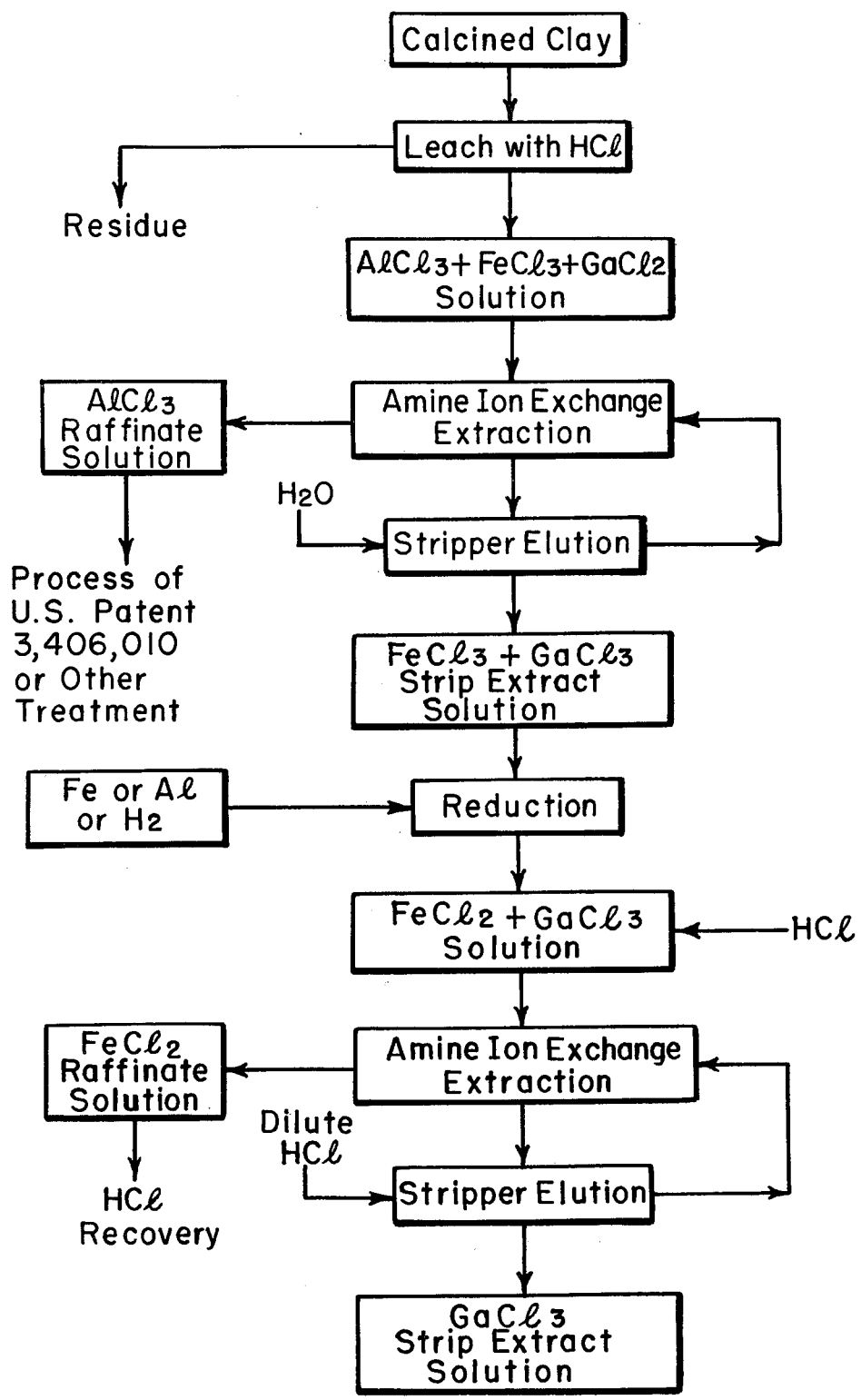

PROCESS FOR RECOVERING GALLIUM

FIELD OF THE INVENTION

The present invention relates to a process for recovering gallium by multiple steps of selectively extracting gallium from a hydrochloric acid leach solution of calcined clay containing aluminum, ferric and gallium chlorides.

BACKGROUND OF THE INVENTION

Because of its low melting point and lack of toxicity, gallium has been used in many diverse applications. For example, gallium has been used instead of mercury in dental alloys, and has been used as a heat transfer medium. Also, gallium has found limited use as the thermometric fluid for high temperature thermometers. More recently high purity gallium has been alloyed with phosphorus or arsenic to form gallium phosphide or gallium arsenide which have found extensive use in the electronics industry.

No ore is known presently which contains any appreciable concentration of gallium. The element is very widely distributed, particularly in aluminous materials where the gallium content is roughly proportional to the aluminum content. Gallium is also found in small concentrations in most zinc blendes, and in germanite where it appears with the mixed sulfides.

Because of the variety of minerals in which gallium occurs, many processes have been developed to concentrate the element. The concentration of gallium from germanite, the richest natural source of gallium, involves the conversion of the germanium and gallium to the chloride, and the more volatile germanium tetrachloride is separated by distillation while the gallium is recovered by electrolysis.

In one of the prior art industrial processes for the recovery of gallium, carbon dioxide gas is blown through a filtrate of sodium aluminate solution obtained as a by-product in the course of the manufacture of alumina to precipitate crude hydroxide of gallium. Alternatively, the filtrate is electrolyzed by using a mercury cathode to produce a gallium amalgam.

In another process for the recovery of gallium, a residue from an electrolytic process or pyrometallurgical process is utilized. The residue is subjected to an acid extraction to prepare a gallium-containing solution, which is then neutralized to precipitate a crude hydroxide of gallium.

The gallium hydroxide is dissolved in a hydrochloric acid solution and thereafter subjected to a liquid-liquid extraction with isopropyl ether to recover the gallium.

Gallium may also be recovered from the alumina purification processes of the aluminum industry. In the Bayer process, aluminum trihydrate is crystallized from a solution of a sodium aluminate by cooling and seeding. In this process, gallium accumulates in the liquor. After concentration of the liquor and an adjustment of the pH, the gallium may be separated by electrolysis. On the other hand, U.S. Pat. No. 2,582,376 discloses a process for removing gallium from alkaline solutions containing dissolved alkali metal aluminate and gallium by adding a soluble calcium compound which results in the precipitation of calcium aluminate while leaving the gallium in the solution. The gallium can then be precipitated and the precipitate redissolved in a solvent to provide a concentrated solution of gallium. Metallic gallium can then be recovered by electrolysis.

The prior art techniques mentioned above have many disadvantages. For example, the process which utilizes blowing of carbon dioxide or neutralization to prepare hydroxide of gallium is complicated in its operations because filtration of the solution is very difficult. In addition, where a starting solution contains many kinds of elements, such as iron, copper, aluminum, etc., too many hydroxides are involved and the yield and selectivity of a desired metal becomes poor.

The electrolytic process utilizing a mercury cathode has disadvantages because current efficiency is very low. The process employing isopropyl ether as an extraction solvent can separate gallium in high selectivity, but it requires a highly concentrated hydrochloric acid solution, which has a high solubility for isopropyl ether, so that life of the solvent is relatively short.

It has now been found that by practice of the present invention, gallium may be recovered from a leach solution rich in chloride values by multiple selective extraction steps which isolate gallium from chloride solutions of aluminum and iron. Thus, difficulties and disadvantages of prior art attempts to recover gallium from leach solutions have been overcome in a simple, highly efficient manner.

SUMMARY OF THE INVENTION

Generally stated, the present invention relates to a process for recovering gallium from a leach solution prepared by dissolving calcined clay in hydrochloric acid. It is found that this acid leach solution containing aluminum, ferric and gallium chlorides may be treated by an amine ion exchange to separate the aluminum chloride and produce a first strip extract solution containing ferric chloride and gallium chloride. This first step extract is treated to reduce the ferric ions contained therein to ferrous ions, and sufficient hydrochloric acid is incorporated to convert the gallium to $GaCl_4^-$ ions. The resulting solution is then treated by a second amine ion exchange to separate the ferrous chloride and to produce a second strip extract containing the gallium, which is recovered.

The invention is described more fully in the following more detailed description of preferred embodiments taken in conjunction with the drawing wherein:

FIG. 1 is a flow diagram illustrating recovery of gallium by practice of the present invention.

DETAILED DESCRIPTION OF THE PREFERRED EMBODIMENTS

In the processing of alumina, calcined clay is leached with hydrochloric acid. Undissolved solid residue is separated and discarded. The leach solution containing aluminum chloride, ferric chloride and gallium chloride is passed to ion exchange treatment. Although concentrated hydrochloric acid may be employed to leach the calcined clay, it is found that as a practical matter less concentrated solutions of hydrochloric acid may be employed such as a 20% (6 molar) hydrochloric acid solution.

The hydrochloric acid leach solution is next treated with an amine ion exchanger which extracts the ferric and gallium values from the aluminum chloride in solution. Methods are well-known to the art for making this separation, such as that disclosed in U.S. Pat. No. 3,082,062. This patent describes amine extraction using any of a large number of commercially available materials such as primary, secondary and tertiary amines, with the secondary and tertiary amines being preferred because of their higher affinity for the chloro-ferrate complex. Useful amines which may be used include, by way of example, triisooctylamine, dodecenyl t-dodecyl amine, n-dodecyl t-dodecylamine, and the like. One commercially available triisooctylamine found to be effective for use herein is that sold by General Mills under the tradename Alamine 336. The amine is dissolved in any suitable water-immiscible organic solvent such as kerosene (the preferred solvent), benzene, toluene, or the like, and the solution may with advantage also contain an alcohol such as decyl alcohol, tridecyl alcohol, or a mixture of lauryl and myristyl alcohol.

The amine-containing organic solution is intimately contacted with the aqueous leach solution, and then these immiscible solutions are allowed to separate. After such mixing and separating, the organic phase, which contains the iron and gallium, is separated from the aqueous phase (the raffinate), which contains the aluminum chloride. The latter is withdrawn from the process and may be treated by any desired procedure, such as by the process of U.S. Pat. No. 3,406,010, for recovery of its aluminum content and its chloride values.

The separated organic phase is then intimately contacted with water or weak acid to strip it of the iron and gallium it contains. The resulting aqueous strip extract solution, containing ferric and gallium chloride, is passed to further treatment, and the stripped organic phase is recycled to treat a further quantity of leach solution.

The first strip extract solution, containing iron (ferric) and gallium chlorides is processed by any one of a number of reactions which effect reduction of ferric ($Fe^{+++}$) ions to ferrous ($Fe^{++}$) ions. For example, reduction may be accomplished by contacting the solution, preferably at an acidic pH, with iron or metallic aluminum, or alternatively by introducing hydrogen gas into the solution.

Sufficient hydrochloric acid then is added to the solution to insure that the gallium ions are converted to gallium tetrachloride ($GaCl_4^-$) ions. The iron in the reduced ferrous condition does not form a stable chloro-ferrate complex.

The solution, now containing iron only in the ferrous form, is again subjected to amine ion exchange, using the same reagents and techniques described above. However, with the iron now in the uncomplexed ferrous form, only the gallium is extracted by the amine reagent, and the ferrous iron remains in the aqueous raffinate phase after separation of the organic phase. This aqueous phase (raffinate) is withdrawn and may be treated by any desired procedure for recovery of hydrochloric acid from the iron chloride.

The organic phase, after separation from the aqueous phase, may be stripped either with water or with weak (e.g. 3 g/l) hydrochloric acid solution to produce a second strip extract solution which contains the gallium substantially free of iron. This gallium-bearing solution, free of major contaminants and with sufficiently high gallium concentration for treatment by known gallium recovery methods, is the end product of the process of the invention. The stripped organic phase is recycled to the extraction unit for continuous processing of additional iron-gallium chloride solution.

The following example illustrates practice of the present invention in greater detail.

EXAMPLE

Calcined clay is leached continuously with 20% by weight solution of hydrochloric acid. The leach solution is separated from the undissolved residue. Analysis of the leach solution shows aluminum, ferric, and gallium ions present. This solution is next passed to an amine ion exchange extractor and contacted countercurrently with a kerosene solution containing triisooctylamine (commercial Alamine 336). A 0.10 molar solution of amine is used, and decyl alcohol is also present in an amount of 6% by weight of the kerosene. The extraction is continuously effected and the organic phase is passed to a stripper for countercurrent stripping with water to produce a first strip extract solution containing ferric chloride and gallium chloride. The organic phase, stripped of its metal values, is then returned to the extractor for continuous processing. The aqueous phase is removed from the extractor and is found to contain aluminum chloride values in solution, and is suitable for further processing by the method disclosed in U.S. Pat. No. 3,406,010.

The ferric iron ($Fe^{+++}$) in the aqueous first strip extract solution is reduced by passing hydrogen into the solution, thereby converting the ferric ions to ferrous ions. The reduced solution is then acidified with hydrochloric acid sufficiently to convert substantially all the gallium in solution to $GaCl_4^-$ ions. Then the reduced solution is again selectively extracted using triisooctylamine, kerosene and alcohol solution as previously indicated.

In this second countercurrent extraction operation, the organic phase, after separation from the aqueous phase, is stripped using a weak (3 g/l) hydrochloric acid solution to recover a second strip extract solution containing gallium. The organic phase is re-cycled back to the extraction unit for continuous processing. The separated aqueous phase contains ferrous chloride in a hydrochloric acid solution and is suitable for treatment to recover hydrochloric acid. The recovered second strip extract solution contains gallium in sufficient concentration so that it may economically be processed to recover gallium metal values by process techniques well known in the art.

From the foregoing, it will be readily apparent to those skilled in the art that various modifications and changes may be effected herein without departing from practice of the present invention.

What is claimed is:

1. A process for recovering gallium from calcined clay which comprises leaching calcined clay with a hydrochloric acid solution, separating the hydrochloric acid solution from residuals, treating the hydrochloric acid solution containing aluminum chloride, ferric chloride, and gallium chloride in an organic-containing amine ion extraction unit for separately recovering aluminum chloride raffinate solution and an organic phase containing ferric chloride and gallium chloride, stripping the organic phase to yield a first strip extract solution containing ferric chloride and gallium chloride, reducing the ferric chloride in such solution to ferrous chloride and incorporating sufficient hydrochloric acid in the reduced solution to convert the gallium therein to $GaCl_4^-$ ions, then treating said solution in a second organic-containing amine ion extraction unit for separately recovering a raffinate solution containing ferrous chloride and a second organic phase containing gallium, stripping the second organic phase to yield a second strip extract solution containing gallium, and recovering the gallium-containing solution.

2. The process of claim 1 wherein the amine used as an extraction medium in each amine ion extraction unit is triisooctylamine dissolved in kerosene.

3. The process of claim 1 wherein the ferric chloride is reduced by metallic iron reduction.

4. The process of claim 1 wherein the ferric chloride is reduced by hydrogen gas.

* * * * *